United States Patent [19]

Lorenz

[11] 4,237,865
[45] Dec. 9, 1980

[54] SOLAR HEATING SIDING PANEL

[76] Inventor: Peter J. Lorenz, Rte. 1, Box 314X, Jefferson, Wis. 53549

[21] Appl. No.: 17,068

[22] Filed: Mar. 2, 1979

[51] Int. Cl.³ .............................................. F24J 3/02
[52] U.S. Cl. ................................. 126/429; 126/422; 126/439; 126/450
[58] Field of Search .............. 126/422, 428, 429, 431, 126/439, 432, 450

[56] References Cited

U.S. PATENT DOCUMENTS

| 246,626 | 9/1881 | Morse | 126/429 |
|---|---|---|---|
| 3,875,925 | 4/1975 | Johnston | 126/429 X |
| 3,990,635 | 11/1976 | Restle et al. | 126/422 |
| 4,046,133 | 9/1977 | Cook | 126/429 |
| 4,068,652 | 1/1978 | Worthington | 126/429 X |
| 4,076,013 | 2/1978 | Bette | 126/431 X |
| 4,098,260 | 7/1978 | Goettl | 126/422 |
| 4,121,565 | 10/1978 | Grisbrook | 126/422 |
| 4,151,954 | 5/1979 | Jacobs | 126/429 X |

FOREIGN PATENT DOCUMENTS 2716362 3/1978 Fed. Rep. of Germany ........... 126/429

Primary Examiner—Samuel Scott
Assistant Examiner—Randall L. Green
Attorney, Agent, or Firm—Andrus, Sceales, Starke & Sawall

[57] ABSTRACT

A solar heating siding panel adapted to be mounted on the side of a building in a vertical position which includes on the outside double panes of clear glass secured in a housing horizontally spaced outwardly of the building. Inwardly of the housing is located a heat collector closed on the inside by a heat exchanger of substantially thin foil material and spaced inwardly of the glass panes. The collector confines dead air to be solar heated through the glass panels. The heat exchanger has a dull color on the inside and a bright surface on the building side. A longitudinal passage extends within the panel between the bright foil inner wall of the heat exchanger and a second bright thin foil abutting the sheathing or outer structural wall of the building. There are lower and upper passages leading from the longitudinal passageway into the lower and upper portions of a room in the building to be heated. Hinged and temperature controlled dampers at both ends of the passages control the flow of the cooler air through the bottom passage from the lower portion of the room into the longitudinal passageway to be heated therein and thence through the upper passage into the upper portion of the room. In addition fail safe dampers are provided at the upper and lower ends of the unit which open to the outside air to permit discharge of heated air from the panel under certain predetermined, usually high temperature conditions.

7 Claims, 5 Drawing Figures

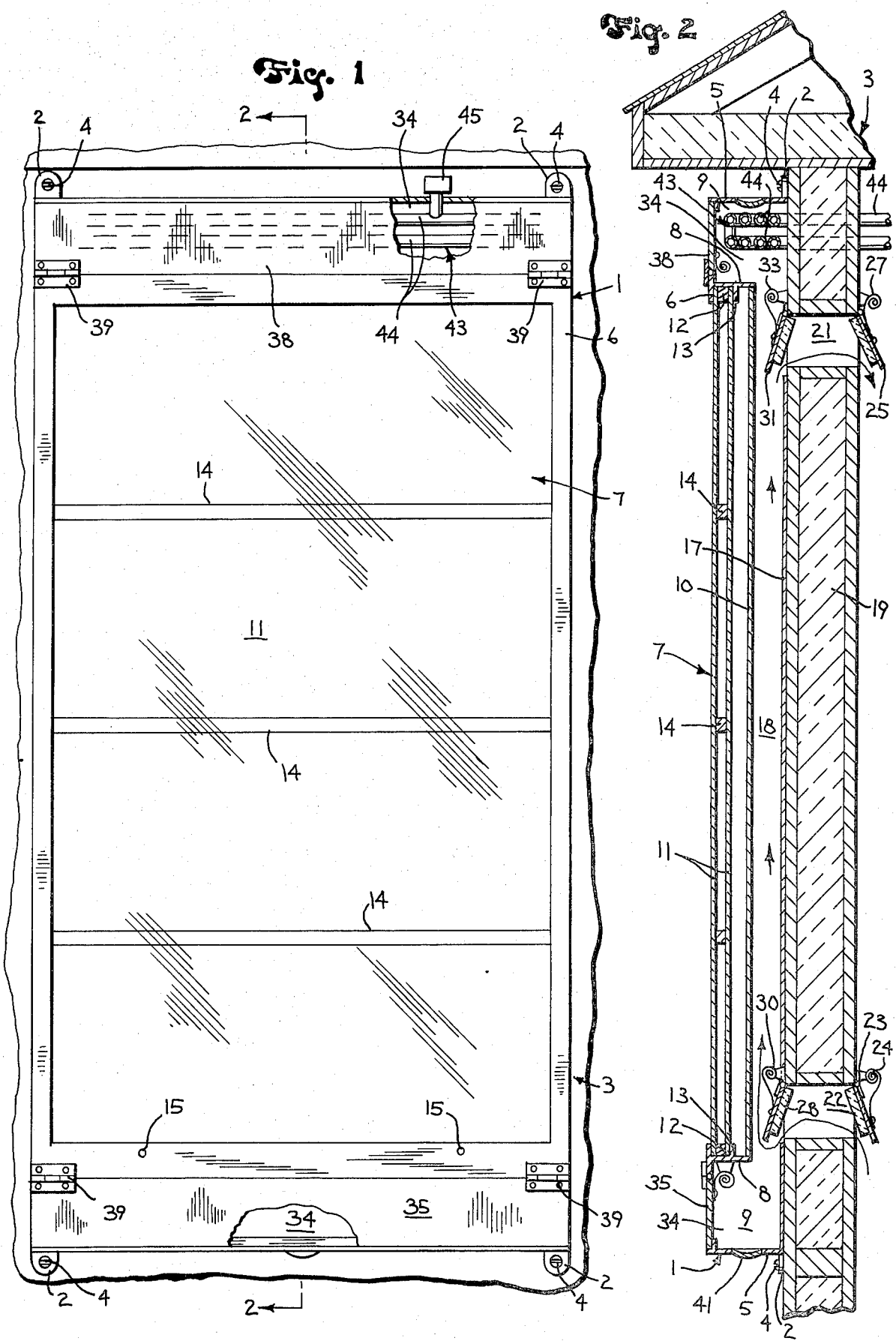

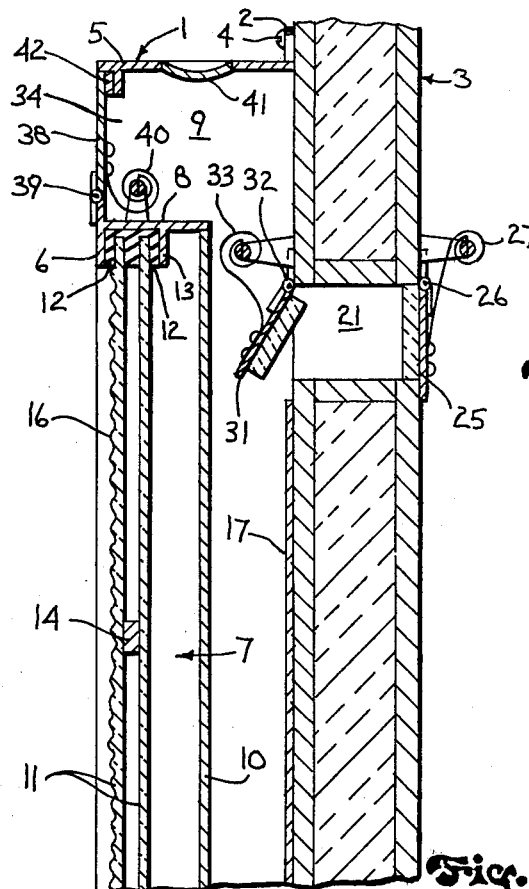
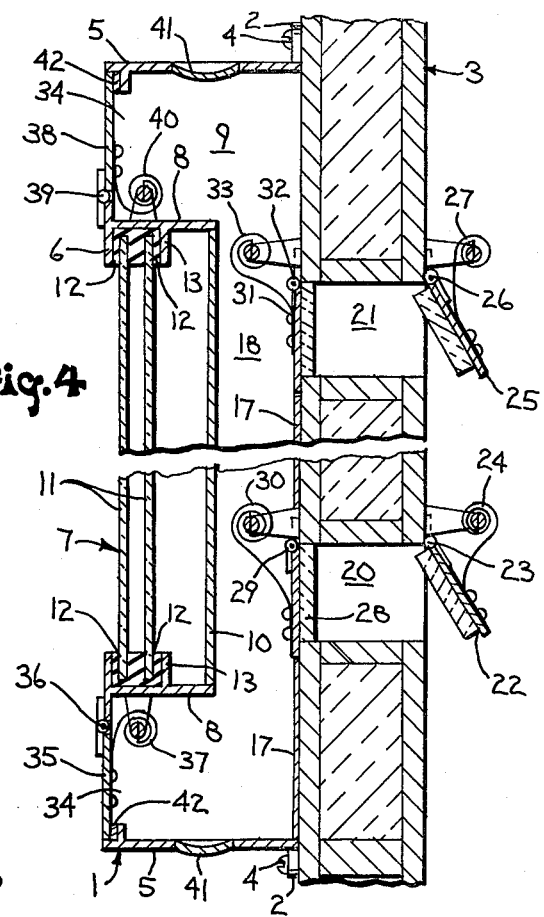
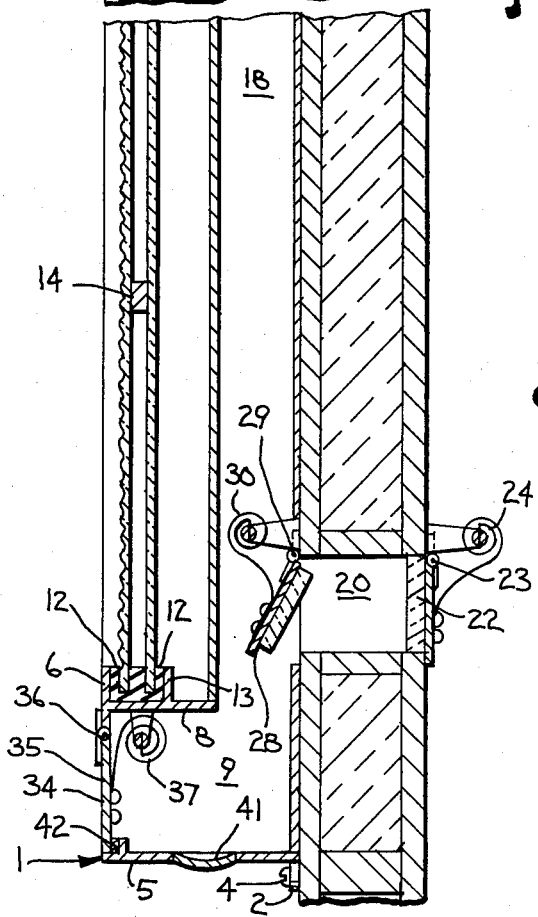
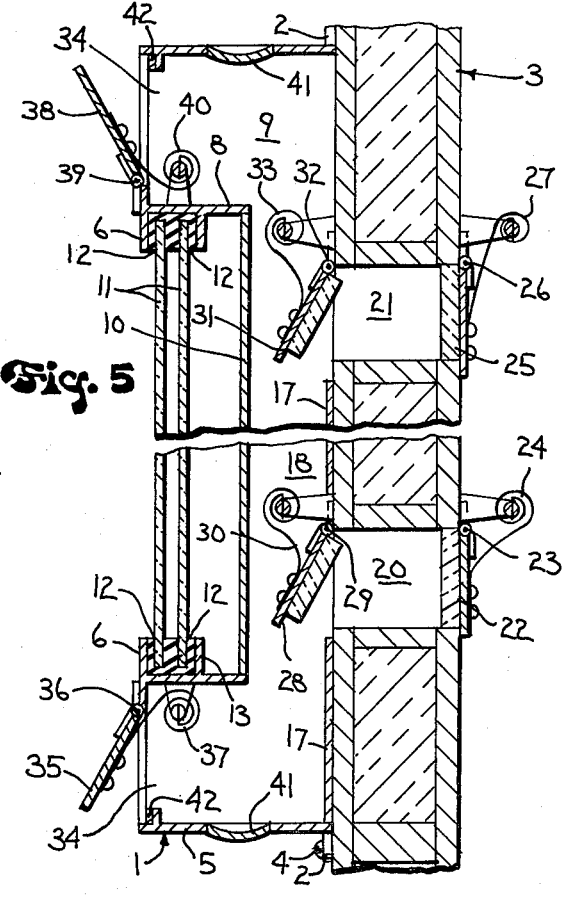
Fig. 3  Fig. 4  Fig. 5

SOLAR HEATING SIDING PANEL

BACKGROUND OF THE INVENTION

The solar heating siding unit of the invention provides a simplified and aesthetic clear glass pane type construction adapted to be secured to the side of a building in a vertical position which efficiently uses solar energy to heat the inside of a building to which it is attached. A heat collector confines the air to be heated by the sun and a heat exchanger of generally thin non-selfsupporting aluminum foil closes in the building side of the unit. Automatic operated dampers control the flow of air though the unit from and into the building and along the heat exchanger and a bright surface secured to the building and fail safe automatic operated dampers provide for discharge of heated air to atmosphere in the event a predetermined high temperature is reached in the unit.

SUMMARY OF THE INVENTION

The solar heating unit of the invention in general is directed to a compact siding panel which is secured to the side of a building. The siding panel includes a housing which supports double clear glass panes which are spaced from the wall of the building and through which the rays of the sun can pass. On the inside of the housing or as a separate member stapled to the building a bright foil of aluminum or the like is located adjacent to the sheathing or wall of the building.

Inside of the siding panel a dead air space is provided by a heat collector having a heat exchanger consisting of an inner generally thin single member of aluminum foil or the like supported by a frame. The foil is painted a dull color on the inside and has a bright surface on the building side. The heat exchanger foil extends longitudinally parallel to and in spaced relation to the glass panes and the bright aluminum foil which is provided against the building surface of the building to be heated. The heat collector is closed at the top and bottom so that it traps the dead air located therein and the air is heated by the sun's rays projecting through the double glass panes to in turn heat the aluminum foil heat exchanger which is spaced from the bright surface provided on the building. By spacing the heat exchanger foil member from the foil member on the building, a longitudinal vertical passage is provided in the siding panel in which any air flowing therethrough is heated by the foil members.

The longitudinal passage terminates at the upper and lower ends in enlarged spaces.

Above the enlarged space at the bottom there is located a horizontal passage in the wall of the building to which the panel is applied which extends into the lower portion of a room of the building to be heated. Below the enlarged space at the top of the siding panel there is located another horizontal passage through the wall of the building into the upper portion of the room of the building to be heated. Under controlled temperature conditions air flows through the lower passage from the lower portion of the room, thence into the longitudinal passage where it is heated by solar heating by the heat exchanger and the bright reflective surface on the building as it flows upwards and then is discharged as heated air into the upper portion of the room.

The flow of the air is controlled by a number of dampers or valves preferably operated automatically by bimetallic temperature sensors.

Each horizontal passage has an outer damper on the end facing the room and an inner damper on the end facing the longitudinal passage. The inner dampers close before the outer dampers because the setting for the inner damper is normally set to close at a temperature lower than the outer damper. The inner dampers both open or close at the same time as do the outer dampers.

Additional fail safe dampers are provided for opening and closing openings in the siding panel at the upper end and lower ends adjacent the generally large spaces in these areas. These dampers open when the temperature in the longitudinal passage reaches a predetermined set higher temperature than that desired in the siding panel and as fail safe protection discharge the heated air to the outside of the panel.

The siding panel also has other features which will be described in detail in the description of the invention.

BRIEF DESCRIPTION OF THE DRAWINGS

The drawings furnished herewith illustrate the preferred construction of the present invention in which the above advantages and features are clearly disclosed as well as others which will be readily understood from the following description of the illustrated embodiments of the invention.

In the drawings:

FIG. 1 is a front view of the siding panel of the invention with parts broken away to illustrate water heater coils;

FIG. 2 is a section taken on line 2—2 of FIG. 1 with the lower and upper dampers to the building room open and air flowing from the lower portion of the room into the longitudinal passageway where it is solar heated and passes into the upper part of the room;

FIG. 3 is a section similar to FIG. 2 with the inner dampers open and the outer or room dampers closed and the fail safe dampers closed in a condition with the air inside the panel increasing in temperature;

FIG. 4 is a section similar to FIG. 2 in a winter setting arrangement such as before sunrise, with the outer dampers open at a setting ready to receive heat but with the inner or room dampers still closed; and FIG. 5 is a section similar to FIG. 2 with the lower and upper fail safe dampers open to atmosphere to discharge the overheated air in the panel and with the inner dampers open but with the outer dampers closed so that no air flows from the room into the longitudinal passage and no heated air is discharged into the room.

DESCRIPTION OF THE PREFERRED EMBODIMENT OF THE INVENTION

Referring to the drawings there is shown a siding heating panel having a housing 1 with the lower and upper vertical extending flanges 2 which are secured to the building structure 3 by the lag bolts 4.

Flanges 2 are joined to the upper and lower horizontally extending closure members 5 of housing 1 which extend horizontally outwardly a substantial distance to space housing 1 a predetermined distance from building structure 3. Closure members 5 are secured at the outer end to frame 6 of housing 1 which is illustrated in FIG. 1 as having a rectangular configuration.

Inside housing 1 is a closed heat collector 7. The upper and lower members 8 of heat collector 7 extend horizontally inwardly from frame 6 in a position inset from the housing closure members 5 to provide the spaces 9 at the upper and lower end of the siding heating panel. Heat collector 7 is closed on the sides and is completed on the inside by a single generally thin non-selfsupporting foil member of bright material such as aluminum or the like which acts as the heat exchanger 10 and is secured at opposite ends to the upper and lower frame members 8. The thickness of the foil providing heat exchanger 10 may be standard working thickness foil.

Heat collector 7 is completed on the outer side by double and horizontally spaced panes 11 of glass which are secured within frame 6. The opposite ends of panes 11 are confined within gasketed grooves 12 provided by frame 6 and respective flanges 13 which extend vertically from the upper and lower closure members 5 of heat exchanger 7. Spacers 14 of plastic or aluminum are located intermittently between the glass panes 11 to support the panes. Normally panes 11 are chemically coated on the inside to prevent excessive condensation forming on the glass of panes 11 and weep holes 15 may be added to likewise aid in overcoming this problem. Normally the outer glass pane 11 is provided with a rippled surface 16 as illustrated in FIG. 3 to eliminate annoying reflections.

The described construction of heat collector 7 provides a dead air space between panes 11 and foil 10 in which the air is heated by the rays of the sun projecting through panes 11. To enhance this build-up of heat in the air, the inside of foil 10 of heat exchanger 7 is painted a dull color. However, the outside of foil heat exchanger 10 which faces building structure 3 remains a bright surface in order to convey heat from the heated air located in heat collector 7 to the air which may be flowing upwardly past the bright surface of heat exchanger 10.

Foil heat exchanger 10 is spaced outwardly of building structure 3 and the latter is covered with a generally thin non-selfsupporting foil 17 of a bright reflectional material such as aluminum which may be provided separately or as a part of the siding heating panel of the invention. The longitudinal passage 18 is thus provided between foil heat exchanger 10 and foil 17 through which the air to be heated flows upwardly of the panel. The bright foil 17 reflects the heat in the flowing air away from the building structure 3 and thereby protects the latter and in turn aids to maintain heat in the air flowing in passage 18.

In order to heat building structure 3, which is shown with the insulation 19, by use of the siding heating panel, a lower passage 20 extends through the wall of building structure 3 from longitudinal passage 18 above lower space 9 and to a room, not shown, of building structure 3. A similar upper passage 21 extends through the wall of building structure 3 from longitudinal passage 18 below the upper space 9 to the same room as the lower passage 20.

The lower passage 20 may be opened or closed on the inside or room side by a valve or damper 22 joined by hinge 23 to building structure 3 and actuated automatically to an open or closed position by the bi-metallic temperature sensor 24, depending upon the temperature at which sensor 24 is set. Sensor 24 is secured at one end to building structure 3 and at the other end to damper 22. Likewise the upper passage 21 on the inner or room side may be opened or closed by a valve or inner damper 25 joined by hinge 26 to building structure 3 and actuated automatically to an open or closed position by the bi-metallic temperature sensor 27 depending upon the temperature at which the sensor 24 is set. Ordinarily when lower damper 22 is closed, then upper damper 25 will be closed as illustrated in FIGS. 3 and 5, or both dampers will be open as illustrated in FIGS. 2 and 4.

The lower passage 20 may be open or closed to longitudinal passage 18 on the outside of building structure 3 by a valve or damper 28 pivoted by hinge 29 to building structure 3 and actuated automatically to an open or closed position by the bi-metallic temperature sensor 30, depending upon the temperature at which sensor 30 is set. Likewise, the upper passage 21 may be opened or closed to building passage 18 on the outside of building structure 3 by a valve or damper 31 pivoted by hinge 32 to building structure 3 and actuated automatically to an open or closed position by the bi-metallic sensor 33 depending upon the temperature at which sensor 33 is set. Ordinarily both damper 28 and damper 31 will simultaneously be open or closed.

In order to provide the siding heating panel with a fail safe construction, several expedients are employed. The spaces 9 on the immediate lower and upper end portions of the siding heating panel open to the atmosphere through the respective lower and upper openings 34 in the frame 6. The lower opening 34 may be closed or opened by a valve or damper 35 which is pivoted by hinge 36 to frame 6. Damper 35 is actuated automatically to an open or closed position by the bi-metallic temperature sensor 37 depending upon the temperature at which the sensor 37 is set which normally is above the temperature at which the dampers employed with passages 20 and 21 connected to the inside of building structure 3 are set. Sensor 37 is secured to the damper 35 and to the lower member 8 of heat exchanger 7.

The upper opening 34 may likewise be closed or opened by a valve or damper 38 which is pivoted by hinge 39 to frame 6. Damper 38 is actuated automatically to an open or closed position by the bi-metallic temperature sensor 40 depending upon the temperature at which sensor 40 is set which normally is above the temperature at which the dampers employed with passages 20 and 21 connected to the inside of building structure 3 are set. Sensor 40 is secured to the damper 38 and to the upper member 8 of heat collector 7. The fail safe dampers 35 and 38 would normally both be open or be closed.

For an additional fail safe protection a plug 41 of plastic or metal is employed at the top and bottom of the siding heating panel of the invention which will melt at a predetermined safe temperature and permit venting of high temperature air in the event dampers 35 and 38 are damaged or fail to open. In order to prevent dampers 35 and 38 from being injured by the wind suddenly opening them, each damper is constructed of metal or if of plastic has a metal insert which engages the magnetic clamping gasket 42 located on the outer side of the upper and lower vertical flange projecting from closure members 5 and 6 respectively of housing 1 against which the dampers 35 and 38 abut when closed.

The operation of the siding panel or unit is described hereinafter in connection with the setting of the various dampers.

Referring to FIG. 2, assume by way of example that the setting is for winter. Thus the sensor 24 of the lower inner damper 22 has been preset by the occupant of the room to close at a temperature selected between 68°–75° F., and to stay open below the selected temperature as illustrated by the open position in FIG. 2. The sensor 30 of outer lower damper 28 has been preset by the occupant to open at a temperature such as 80° F. and stay open at that temperature and that temperature has been reached so damper 28 is open. At the same time, the sensor 27 of the upper inner damper 25 has been preset by the occupant of the room to close at a temperature selected between 70°–85° F., and to stay below the selected temperature as illustrated by the open position in FIG. 2. The sensor 33 of the upper outer damper 31 has been preset to open at a temperature such as 80° F. and stay open at that temperature and that temperature has been reached so damper 28 is open. Under the described settings the air to be heated flows through a lower passage 20 into the longitudinal passage 18 where it is solar heated and is then discharged through upper passage 21 into the room of building 3. The lower fail safe damper 35 and upper fail safe damper 38 are preset to open at a temperature selected from 100°–145° F. and are shown as closed in FIG. 2 because the temperature in the panel has not reached the selected high temperature.

In the summer the temperature settings of the sensors to actuate the inner dampers 22 and 24 would be from approximately 55°–60° F.

FIG. 3 illustrates the position of the dampers when the panel is heating up to deliver heat to the room. In this condition, the respective sensors 30 and 33 have been actuated at 80° F. to open the outer dampers 28 and 33 respectively but the temperature sensors 24 and 27 have not reached a condition where heat to the room is called for by opening lower inner damper 22 and upper inner damper 25 respectively.

FIG. 4 illustrates the solar heating siding panel in a condition before sunrise to receive heat but no heat yet being produced. Thus the inner lower damper 22 which has been set at 68° is open and the inner upper damper 25 which has been set at 75° is also open. All the other dampers in the panel remain closed.

In FIG. 5, the sensors 37 and 40 have been set to open the fail safe dampers 35 and 38 respectively at a temperature, for example, 135° F. This temperature has been reached so that the heated air is being discharged to the atmosphere with the outside air entering the longitudinal passage 18 at the lower end and forcing the hot air out through the upper end of the panel.

In order to heat water in the solar heating siding panel, particularly in the summer, water heating coils or pipes 43 may be located therein such as in the upper space 9 as shown only in FIGS. 1 and 2. As illustrated in FIGS. 1 and 2, coils 44 extend therefrom to the coils of a water heater or the like, not shown. It is also necessary to provide a safety valve 45 set to a predetermined temperature to discharge the water to overcome any problems of overheating.

The vertical location of the solar heating panel of the invention provides for the sun's rays to contact the panel at the lower incidence of reflection of the sun's rays in winter because of the lower position of the sun. In the summer the high solar angle of incidence of the sun's rays tends to reflect sunlight downward and lessen the heating of the panel. The panel may also be operated from reflected lighting from another building or from a mound of dirt covered with ice and snow.

Although the dampers are preferably operated automatically by sensors, the dampers could be operated manually. The temperature sensors for actuating the dampers are manually set to the desired temperature from outside the panel and in the building by cranks, not shown, which rotate the metal of the bi-metallic sensors to the desired temperature setting.

A space is left in the building to receive the panel or panels and the panel blends into the building and provides an aesthetic appearance.

Current siding materials and technology fail to deal with thermal and chemical actions in such an advanced way as the present invention. Current siding materials actually seek to prevent solar energy from giving the structure any heat in winter when it is needed and prevent any shading or cooling in summer when that is needed. The siding materials used previously all rely on an insulated mass to moderate any undesirable gains or losses. In winter, when the sun shines on conventional siding, the siding gets hot but immediately gives up its heat to the cold atmosphere, not the structure. In the summer the siding again gets hot but because of higher outside air temperatures. The siding cannot release its gained heat easily and eventually acts as a heat sink transferring heat into the building interior. Trends and lower initial costs have reinforced this type of design thought in the siding market.

Furthermore, the exterior siding material has always been exposed to the elements, and more commonly, various corrosive pollutants that lessen life and fade coloration.

Other problems of conventional sidings include thermal expansion and contraction. Large lengths of masses of siding varying over 150° on a Fahrenheit scale cause cracking, buckling, crazing, and fatigue of surface forcing a shorter life for the material.

In winter, when the solar heating siding panel of the invention is struck by light, the heat that is gained is not lost to the atmosphere but added to the house interior or used to warm the house exterior wall and thereby cause the building to lose less heat through the wall. In summer when heat is not needed, the solar siding panel is not heated by effectively venting any heat gained by the panel siding into the atmosphere. Hence, even though the panel siding is in the sun, the building wall is in the shade. Conventional siding secured to the building leaves only heated contacts or heated air spaces adjacent the building walls. Furthermore, the transparent surface of the solar heating siding panel of the invention reflects much of the unneeded light energy in summer because of the high solar angle on the vertical surface of the siding. Conventional siding materials and design have little tendency to do this. In summer by passing the hot air to be vented over pipes in the upper fail safe area preheating of a domestic hot water supply can also be accomplished. This could never by done with conventional siding.

Because the solar heating siding panel of the invention has an outer transparent cover of glass or plastic or the like, it does not suffer the degradation from the elements and pollutants such as conventional siding does. Being of a clear exterior, it cannot fade. Being thicker than paints and films, it cannot peel. It will not rust, and can be made undentable, and unbreakable.

Because the dull coloration of the solar heating siding panel on the inside is bonded to a thin metal foil which is supported in a framework, it can expand and contract over an extreme temperature range and not be so rigid as to crack or buckle the coloration layer off as in a more rigid solar heating assembly. Also since it is protected from wind and rain, it will not be easily corroded and thus give the owner extremely long product life.

The thin foil heat exchanger may also be easily changed at little cost for other colors on the inside surface. The owner may find such a feature highly desirable if he tires of one color, or if the heat exchanger of the solar heating siding panel should be acidentally damaged. The design of the invention would allow panel parts or complete panels to be replaced with relative ease. This cannot be done with conventional siding structures.

The important aspect of using a bright metal foil to protect the building outer structural wall has not been discovered by others. As in other siding methods, insulation, or a material acting as an insulant, is used to prevent heat gains or losses. While this has been the acceptable method for some time, it has also been bulky, expensive, and in the case of some materials used, dangerous. Bright foil in the design of the present invention acts to prevent heat gains or losses to the outer structural wall. Its advantages are that it is cheap, safe and compact.

The important aspect of using a single non-self supporting metal foil as a collector-heat exchanger has also been ignored. Others have failed to recognize that its thinness would allow flexing under thermal expansion and that it would not craze or crack surface coverings. Also, because of the thin mass, this material would heat up faster than stiff or rigid plate or sheet, thereby allowing superior collection of energy during periods of alternate cloudiness and brightness. The brightness of the non-self supporting foil on the building side of the heat exchanger is equally important. It allows rapid dissipation of the collected heat into the air. The bright foil does a far better job of this than normal rigid sheets or plates. It is a more efficient heat exchanger. Foils are lighter, and cheaper, than any other metal product for this application. The present siding is lighter than other types and thus saves energy in transportation to building sites. It will place less stress on the building and provide faster and easier erection.

Generally, a metal foil is considered to be no thicker than a common tree leaf. However, a nominal thickness of one-thousandth to one ten-thousandth of an inch thick are standard working sizes used in the foils of the invention. Both the foils of the invention are of a thinness that they require a framework to support them.

Various modes of carrying out the invention are contemplated as being within the scope of the following claims, particularly pointing out and distinctly claiming the subject matter which is regarded as the invention.

I claim:

1. A solar heating siding panel assembled in a vertical position on the side of a building for heating an air space within the building, which comprises a housing adapted to be secured to the building, said housing having a frame member horizontally spaced from a wall of the building, double panes of glass secured within the frame in a vertical position, A thin non-supporting foil-like heat exchanger secured within the frame in a vertical position, said heat exchanger being located in a space relationship between said panes of glass and said wall of the building for forming a dead air spaced and a longitudinal passage for heating air by solar energy respectively, the surface of the foil heat exchanger facing the panes of glass being of a dull color and the surface of the foil heat exchanger facing said wall provided as a bright reflective surface, a bright foil-like reflective material provided against the wall of the building a first passage through the wall of the building connecting the lower portion of the longitudinal passageway to the air space within the building, a second passage through the wall of the building connecting the upper portion of the longitudinal passageway to the air space within the building, temperature controlled valve means opening and closing the first passage under predetermined temperature settings to control the flow of room air from inside the building to the longitudinal passage to be heated therein by solar energy, and additional temperature controlled means opening and closing the second passage to control the flow of heated air into the building through the second passageway.

2. The solar heating siding panel of claim 1, and upper and lower air openings in the housing to the outside atmosphere, and normally closed fail safe temperature controlled means opening the air openings to the atmosphere for entry of outside air and discharge of heated air from the panel under predetermined potentially dangerous high temperature conditions.

3. The solar heating siding panel of claim 1, and the temperature controlled means for the first passage including an inner damper pivoted over an inner end of the first passage which is located internally of said air space and a bi-metallic temperature sensor secured to the inner damper and to the building and adapted to be set at a predetermined temperature to actuate the inner damper to an open or closed position, and the temperature controlled means also including an outer damper pivoted over the opposite end of the first passage and a bi-metallic temperature sensor secured to the outer damper and to the building and adapted to be set at a predetermined temperature normally higher than the temperature setting for the inner damper, and the temperature controlled means for the second passage including an inner damper pivoted over the inner end of the second passage and a bi-metallic temperature sensor secured to the inner damper and to the building and adapted to be set at a predetermined temperature to actuate the inner damper to an open or closed position, and the temperature controlled means for the second passage also including an outer damper pivoted over the opposite end of the second passage and a bi-metallic temperature sensor secured to the outer damper and to the building and adapted to be set at a predetermined temperature normally higher than the temperature setting for the inner damper.

4. The solar heating panel of claim 2, and plug means disposed in the housing which is meltable at a predetermined high temperature to emit overheated air through openings in the housing thereby provided upon melting and thus supply additional protection against potentially dangerous high temperatures.

5. The solar heating siding panel of claim 1, and the temperature controlled means including a first damper pivoted over the outside of the first passage and a bi-metallic temperature sensor secured between the first damper and the wall and adapted to be set at a predetermined temperature to actuate the first damper to an open or closed position, and the temperature controlled means also including a second damper pivoted over the outside of the second passage and a bi-metallic temperature sensor secured between the second damper and the wall and adapted to be set at a predetermined temperature to actuate the second damper to an open or closed position.

6. The solar heating siding panel of claim 1, and water heating coils located internally in an upper portion of the panel to additionally use the heat developed in the panel to provide heated water from the panel, and safety means connected to the coils to dissipate the heated water in the event of overheating.

7. The solar heating siding panel of claim 1, and the outer pane of glass having a rippled surface to eliminate annoying reflections.

* * * * *

UNITED STATES PATENT AND TRADEMARK OFFICE
CERTIFICATE OF CORRECTION

PATENT NO. : 4,237,865
DATED : December 9, 1980
INVENTOR(S) : PETER J. LORENZ

It is certified that error appears in the above-identified patent and that said Letters Patent are hereby corrected as shown below:

| | | |
|---|---|---|
| Abstract, | line 26, | Cancel "usually" and substitute therefor ---unusually---; |
| Column 1, | line 63, | Cancel "surface" and substitute therefor ---surfaces---; |
| Column 4, | line 60, | After "siding" insert ---heating---; |
| Column 5, | line 41, | After "example," insert ---at---; |
| Column 7, CLAIM 1 | line 54, | Cancel ".A" and substitute therefor ---, a---; |
| Column 7, CLAIM 1 | line 56, | Cancel "space" and substitute therefor ---spaced---; |
| Column 7, CLAIM 1 | line 57, | Cancel "spaced" and substitute therefor ---space---; |
| Column 7, CLAIM 1 | line 63, | After "building" before "first" insert ---,--- (a comma) |

Signed and Sealed this

Twelfth Day of May 1981

[SEAL]

Attest:

RENE D. TEGTMEYER

Attesting Officer     Acting Commissioner of Patents and Trademarks